J. BOBER.
WHEEL.
APPLICATION FILED MAR. 2, 1917.
1,285,003.
Patented Nov. 19, 1918.
2 SHEETS—SHEET 2.
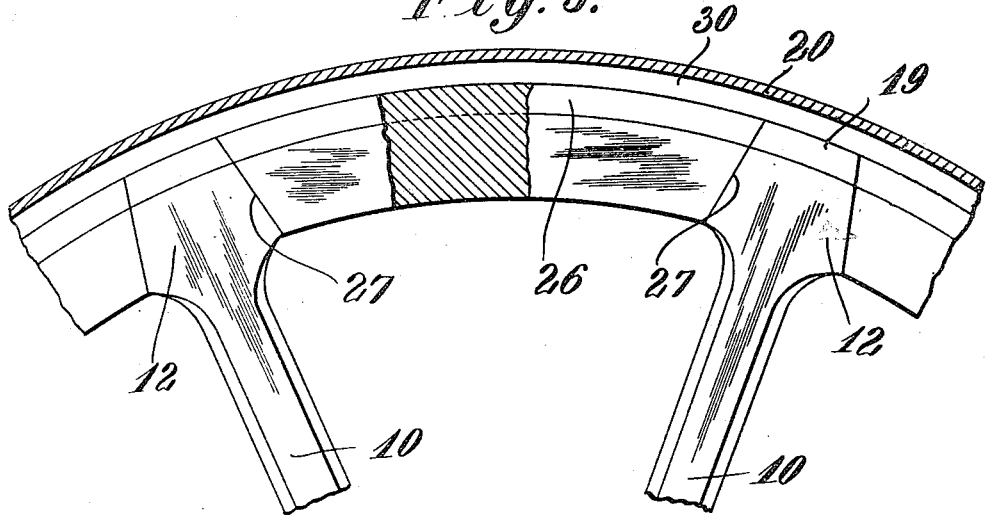
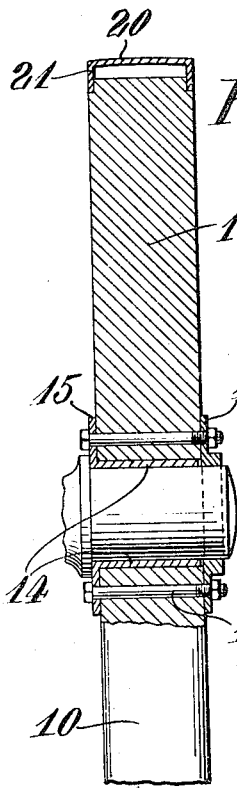
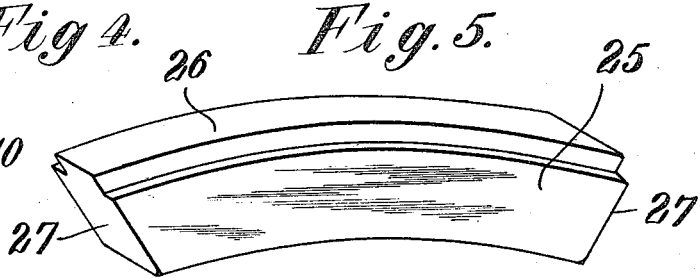
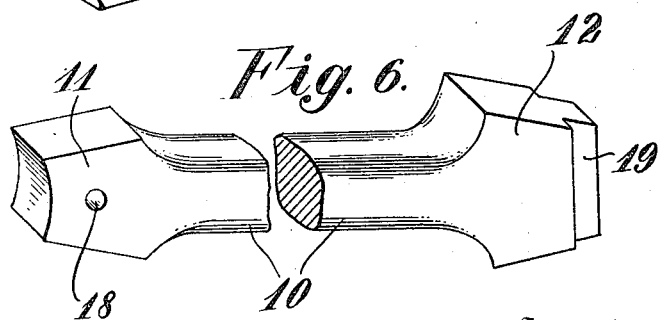
Inventor
John Bober.
By his Attorney
Oscar Geier.

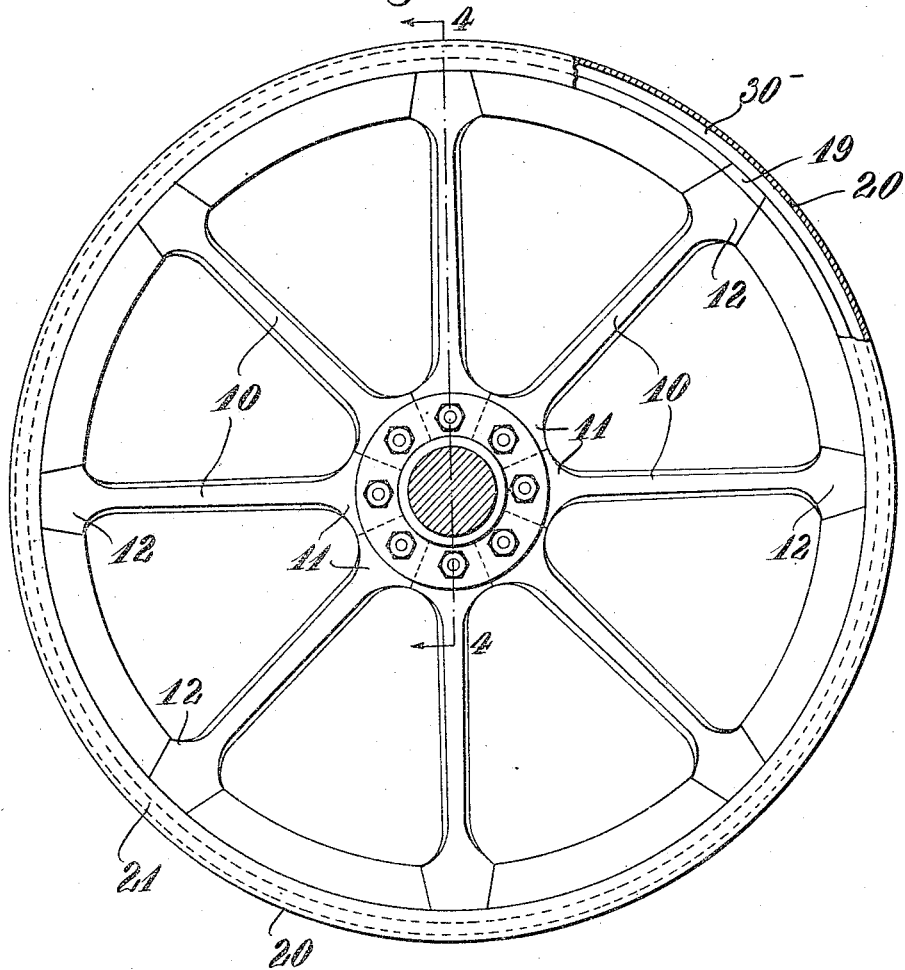
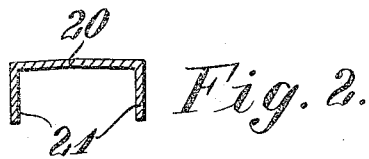

UNITED STATES PATENT OFFICE.

JOHN BOBER, OF HAMTRAMCK, MICHIGAN.

WHEEL.

1,285,003.     Specification of Letters Patent.     Patented Nov. 19, 1918.

Application filed March 2, 1917. Serial No. 151,913.

*To all whom it may concern:*

Be it known that I, JOHN BOBER, a subject of the Czar of Russia, resident of village of Hamtramck, county of Wayne, and State of Michigan, have invented certain new and useful Improvements in Wheels, of which the following is a specification.

This invention relates to improvements in vehicle wheels, and has as its principal object the provision of a wheel in which the fellies and spokes are interchangeably engaged within the rim or tire.

A further object is to provide a wheel which may be cheaply made, and which may be readily repaired by any ordinary mechanic without taking the same to a wheelwright shop should damage occur to any of its elements.

These and other objects are attained by the novel design, construction and combination of parts hereafter described and shown in the accompanying drawings, forming a material part of this specification, and in which:—

Figure 1 is a side view showing a wheel made in accordance with the invention, parts being broken away to exhibit the interior.

Fig. 2 is a transverse sectional view of the rim.

Fig. 3 is an enlarged fragmentary view indicating the construction.

Fig. 4 is a transverse sectional view taken on line 4—4 of Fig. 1.

Fig. 5 is a perspective view showing the felly section, and

Fig. 6 is a perspective view of one of the spokes.

The wheel is comprised of a plurality of spokes 10, having beveled or wedge shaped hub ends 11, the outer ends 12 of the spokes being enlarged and substantially of the same shape as the inner ends.

In order to hold the hub ends of the spokes in proper relation after assemblage, there may be inserted a sleeve 14 having flange 15, a similar flange 16 being upon the opposite side, the same being engaged by bolts 17 or other like fastenings passing through openings 18 in the enlarged inner ends 11 of the spokes.

The outer ends 12 are formed with an extending central tenon 19 formed with a radius equivalent to the inner radius of the rim or tire 20, which is preferably of a channel shape, the flanges 21 engaging alongside the tenons 19.

The fellies 25 are formed with a raised, peripheral portion 26 corresponding in height and width to the tenons 19, the thickness of the outer end of the spokes being similar to that of the fellies 25, the ends of the latter elements being beveled, as at 27 to agree with the face of the spokes.

In assembling the wheel, the felly segments are placed in position between adjacent spokes, the outer ends of which are level with the felly so that a rim of parallel thickness is produced.

The inner ends of the spokes are then pressed level and held by reason of the flanged hubs as indicated.

It will be noticed that a space 30 is provided between the inner wall 20 of the tire, and the outer surface of the tenons 19 and 26, which admits of the spokes being assembled as herein stated.

Having thus described my invention, what I claim as new, and desire to secure by Letters Patent, is:—

In a wheel of the character described, the combination of a felly consisting of a plurality of sections having the ends thereof beveled, spokes having heads provided upon the outer ends thereof, said heads being beveled to conform to the bevel of the felly sections and disposed between the ends thereof, the inner ends of said spokes being enlarged and beveled to engage each other for forming a hub having a central opening, a sleeve fitted in said central opening, a flange formed upon one end of the sleeve and engaging the spokes on one side of the wheel, a collar disposed upon the opposite side of the wheel, fastening devices passing through the flange of the sleeve and through said collar for securing the spokes in normal position, the opposite sides of the felly sections and adjacent side portions of the spokes having grooves provided therein, a tire disposed around said felly and spokes, said tire having flanges formed upon the opposite sides thereof for engaging the grooves in the side of the felly sections and spokes, said flanges of the tire being greater in width than the depth of the groove for retaining said tire in spaced relation to the felly and the end of the spokes, substantially as described, and for the purpose set forth.

In testimony whereof I have affixed my signature this 27th day of February, 1917.

JOHN BOBER.

Witnesses:
CHARLES E. DE LONG,
NORA MAE DE LONG.

Copies of this patent may be obtained for five cents each, by addressing the "Commissioner of Patents, Washington, D. C."